US012666350B2

(12) United States Patent
Balmakhtar et al.

(10) Patent No.: US 12,666,350 B2
(45) Date of Patent: Jun. 23, 2026

(54) CORE NETWORK RFID READER COMMUNICATION SERVICE

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 237 days.

(21) Appl. No.: 18/423,273

(22) Filed: Jan. 25, 2024

(65) Prior Publication Data

US 2025/0247775 A1    Jul. 31, 2025

(51) Int. Cl.
| | |
|---|---|
| *H04W 4/00* | (2018.01) |
| *H04W 4/80* | (2018.01) |
| *H04W 24/08* | (2009.01) |
| *H04W 48/16* | (2009.01) |
| *H04W 48/18* | (2009.01) |

(52) U.S. Cl.
CPC ............. *H04W 48/18* (2013.01); *H04W 4/80* (2018.02); *H04W 24/08* (2013.01); *H04W 48/16* (2013.01)

(58) Field of Classification Search
CPC ....... H04W 48/16; H04W 48/18; H04W 4/80; H04W 4/029; H04W 4/02; H04W 24/08; H04W 60/00; H04W 60/04; H04W 88/06

USPC .......................................................... 370/329
See application file for complete search history.

(56) References Cited

U.S. PATENT DOCUMENTS

| | | | | | |
|---|---|---|---|---|---|
| 8,583,044 | B2 * | 11/2013 | Dua | .................... | H04L 65/1069 |
| | | | | | 455/2.01 |
| 9,466,046 | B1 * | 10/2016 | Theobald | ............. | G06Q 10/087 |
| 2015/0379317 | A1 * | 12/2015 | Kelly | ................... | G06Q 10/087 |
| | | | | | 705/28 |
| 2021/0120408 | A1 * | 4/2021 | Pazhyannur | .......... | H04L 63/101 |
| 2021/0219219 | A1 * | 7/2021 | Sundararaj | ............ | H04W 48/18 |

* cited by examiner

*Primary Examiner* — Temica M Beamer

(57) ABSTRACT

A method of providing a communication service to a radio frequency identity (RFID) tag reader. The method comprises allocating network slice resources of a telecommunication network for the reader by a controller by sending a first message to a network slice selection function (NSSF) in the network, wherein the controller is an application that executes on a computer system in the network; providing a communication channel between the reader and an enterprise inventory control system via the allocated network slice resources; monitoring messages in the communication channel by the controller; analyzing the messages by the controller; determining by the controller a network slice resource need of the communication channel that differs from a current allocation of network slice resources based on the analyzing; and adapting the communication channel by the controller by sending messages to the NSSF to allocate different network slice resources associated with the communication channel.

20 Claims, 8 Drawing Sheets

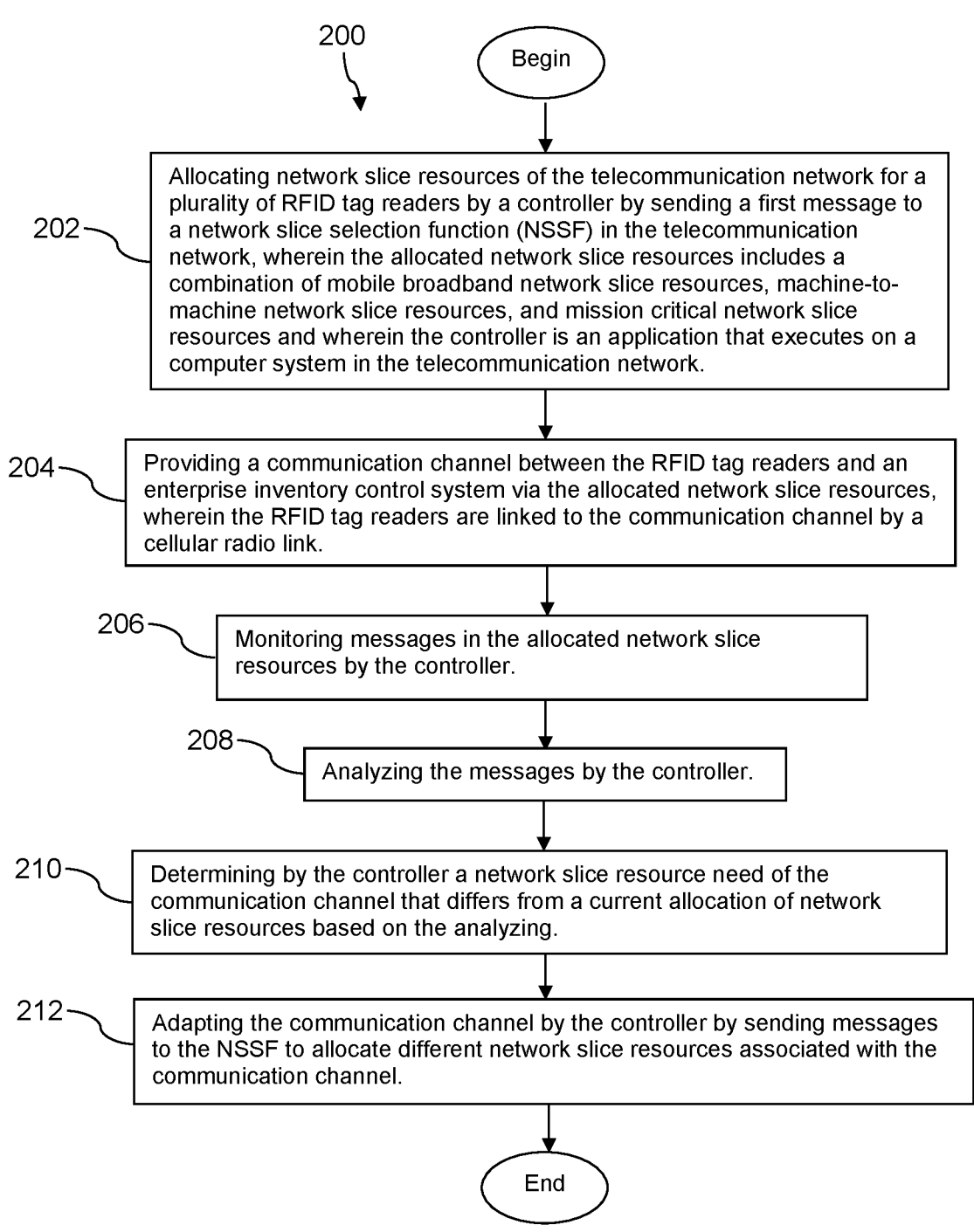

200

Begin

202 — Allocating network slice resources of the telecommunication network for a plurality of RFID tag readers by a controller by sending a first message to a network slice selection function (NSSF) in the telecommunication network, wherein the allocated network slice resources includes a combination of mobile broadband network slice resources, machine-to-machine network slice resources, and mission critical network slice resources and wherein the controller is an application that executes on a computer system in the telecommunication network.

204 — Providing a communication channel between the RFID tag readers and an enterprise inventory control system via the allocated network slice resources, wherein the RFID tag readers are linked to the communication channel by a cellular radio link.

206 — Monitoring messages in the allocated network slice resources by the controller.

208 — Analyzing the messages by the controller.

210 — Determining by the controller a network slice resource need of the communication channel that differs from a current allocation of network slice resources based on the analyzing.

212 — Adapting the communication channel by the controller by sending messages to the NSSF to allocate different network slice resources associated with the communication channel.

End

FIG. 3

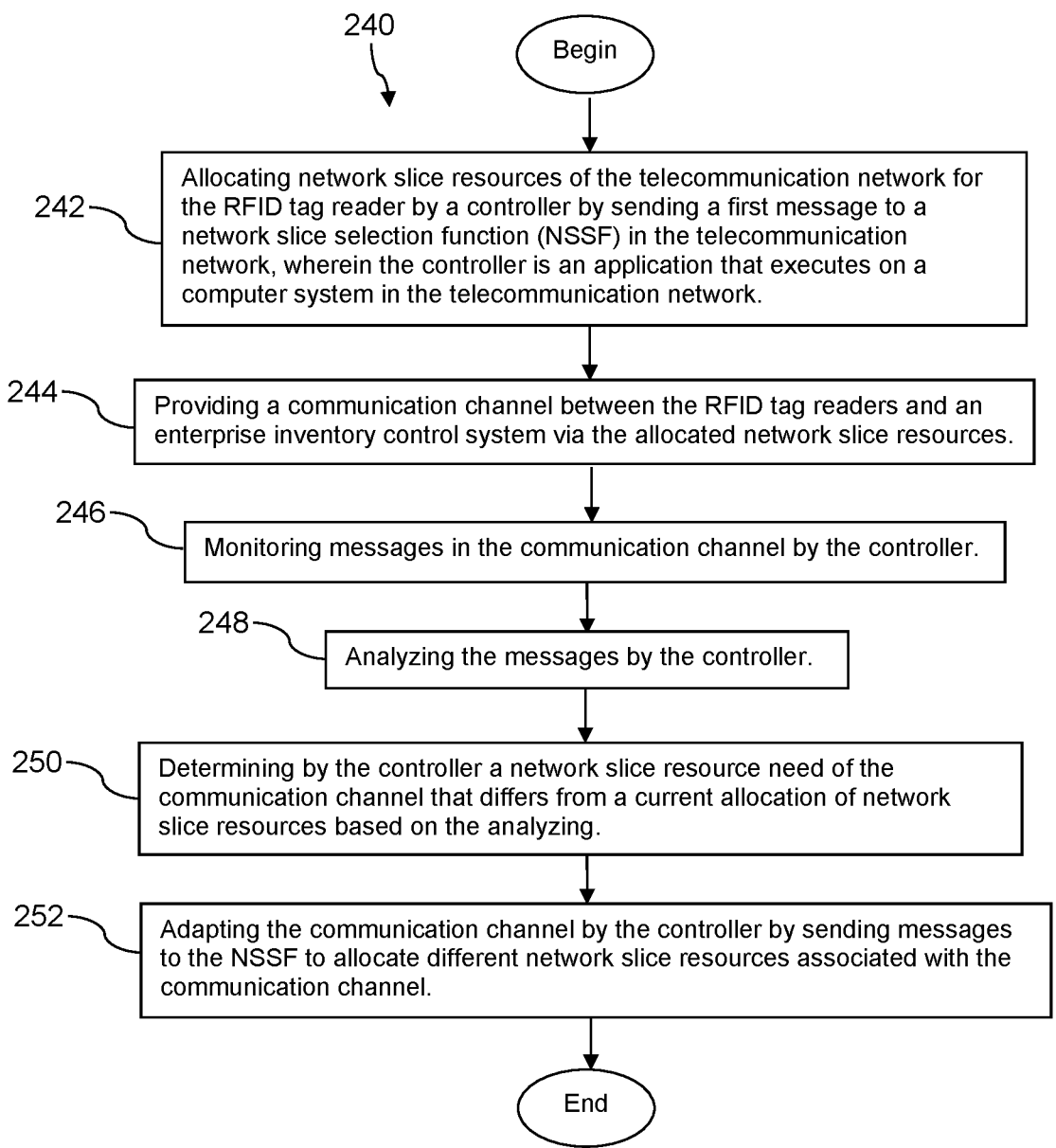

240

Begin

242 — Allocating network slice resources of the telecommunication network for the RFID tag reader by a controller by sending a first message to a network slice selection function (NSSF) in the telecommunication network, wherein the controller is an application that executes on a computer system in the telecommunication network.

244 — Providing a communication channel between the RFID tag readers and an enterprise inventory control system via the allocated network slice resources.

246 — Monitoring messages in the communication channel by the controller.

248 — Analyzing the messages by the controller.

250 — Determining by the controller a network slice resource need of the communication channel that differs from a current allocation of network slice resources based on the analyzing.

252 — Adapting the communication channel by the controller by sending messages to the NSSF to allocate different network slice resources associated with the communication channel.

End

FIG. 5

CORE NETWORK RFID READER COMMUNICATION SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional radio frequency identity (RFID) tags are passive electronic devices that harvest power from ambient electromagnetic waves and utilize this harvested power to broadcast their identity with a low-power radio frequency signal. These RFID tags may be manufactured very cheaply and in mass quantities. They may be affixed to mass produced goods such as clothing, food items, and drinks for use in inventory control and point-of-sale transactions. These conventional RFID tags may be read by a RFID reader that emits suitable electromagnetic waves that the RFID tags can harvest power from. The RFID reader may read the identity signal broadcast by the RFID tags when irradiated with the electromagnetic waves emitted by the RFID reader.

SUMMARY

In an embodiment, a method of providing a communication service in a telecommunication network to a plurality of radio frequency identity (RFID) tag readers located in a warehouse and an enterprise inventory control system located remotely from the warehouse is disclosed. The method comprises allocating network slice resources of the telecommunication network for a plurality of RFID tag readers by a controller by sending a first message to a network slice selection function (NSSF) in the telecommunication network, wherein the allocated network slice resources includes a combination of mobile broadband network slice resources, machine-to-machine network slice resources, and mission critical network slice resources and wherein the controller is an application that executes on a computer system in the telecommunication network; and providing a communication channel between the RFID tag readers and an enterprise inventory control system via the allocated network slice resources, wherein the RFID tag readers are linked to the communication channel by a cellular radio link. The method further comprises monitoring messages in the allocated network slice resources by the controller; analyzing the messages by the controller; determining by the controller a network slice resource need of the communication channel that differs from a current allocation of network slice resources based on the analyzing; and adapting the communication channel by the controller by sending messages to the NSSF to allocate different network slice resources associated with the communication channel.

In another embodiment, a method of providing a communication service in a telecommunication network to a radio frequency identity (RFID) tag reader is disclosed. The method comprises allocating network slice resources of the telecommunication network for the RFID tag reader by a controller by sending a first message to a network slice selection function (NSSF) in the telecommunication network, wherein the controller is an application that executes in a network exposure function (NEF) that executes on a computer system in the telecommunication network; and providing a communication channel between the RFID tag reader and an enterprise inventory control system via the allocated network slice resources. The method further comprises monitoring messages in the communication channel by the controller and analyzing the messages by the controller. The method further comprises determining by the controller a network slice resource need of the communication channel that differs from a current allocation of network slice resources based on the analyzing and adapting the communication channel by the controller by sending messages to the NSSF to allocate different network slice resources associated with the communication channel.

In yet another embodiment, a method of providing a communication service in a telecommunication network to a radio frequency identity (RFID) tag reader is disclosed. The method comprises allocating network slice resources of the telecommunication network for the RFID tag reader by a controller by sending a first message to a network slice selection function (NSSF) in the telecommunication network, wherein the controller is an application that executes on a computer system in the telecommunication network; and providing a communication channel between the RFID tag reader and an enterprise inventory control system via the allocated network slice resources. The method further comprises monitoring messages in the communication channel by the controller; analyzing the messages by the controller; determining by the controller a network slice resource need of the communication channel that differs from a current allocation of network slice resources based on the analyzing; and adapting the communication channel by the controller by sending messages to the NSSF to allocate different network slice resources associated with the communication channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to an embodiment of the disclosure.

FIG. 5 is a flow chart of yet another method according to an embodiment of the disclosure.

DETAILED DESCRIPTION

Figure 1:
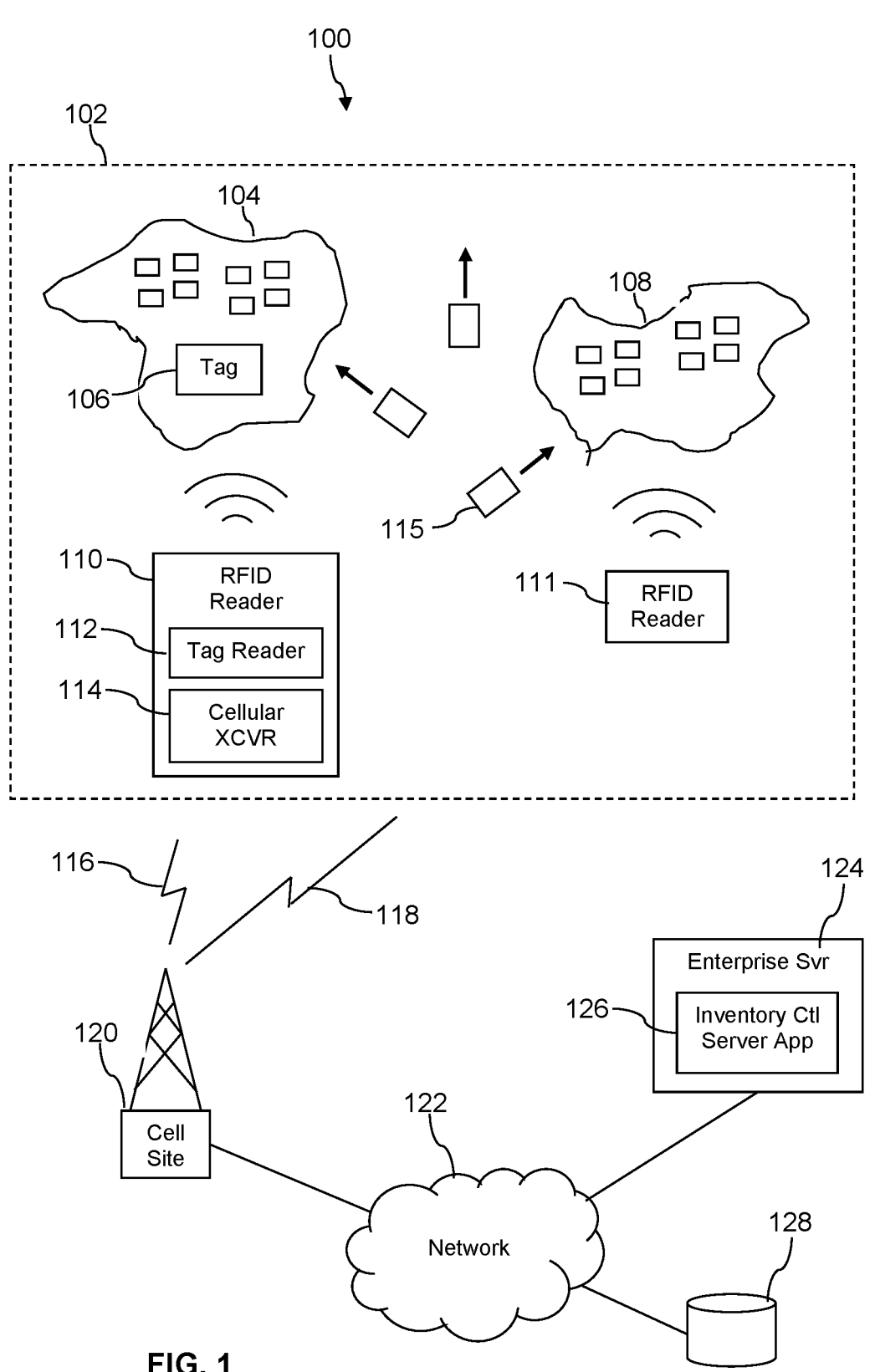
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Enterprises may desire to have increased visibility into their supply chains, whereby to better manage and control the timely delivery of their end products to their customers. At present, enterprises may establish ad hoc communication channels with individual suppliers that may suffer from a variety of disadvantages including lack of scalability, inconsistencies, and plain poor visibility into supplier activities. The present disclosure teaches a communication channel service that can be established between enterprises and suppliers that is provided in a repeatable, scalable, reliable way in the core network of a telecommunication service provider. While a specific use case involving an enterprise monitoring inventory of items in a supplier warehouse is described to motivate and explain the communication service channel described herein, it will be appreciated that the novel communication service channel described can provide advantages in other interactions between enterprises and their supply chain partners. It is noted that increasing importance is being placed on managing and understanding supply chains due to uncertainties in the global business environment.

A communication channel can be provided between supply chain partners using a combination of different network slice facilities. The 5G core network has deployed different network slices that can be configured and instantiated to support different needs of different communication customers. The network slice paradigm will likely be a technology feature that is carried forwards into later generations of telecommunications networks, such as 6G and later technologies. A network slice is a logically dedicated portion of network resources that can be configured and managed according to its own set of rules and policies, for example rules and policies defined by the customer. Network slices can be provided by a mobile broadband network slice, by a machine-to-machine network slice, and/or by a mission critical network slice. It is also possible to define custom network slices that do not fit neatly into these three categories of network slices.

The disclosure contemplates a communication channel controller that executes in the core network of the telecommunication service provider to provide communication service to an enterprise to communicate more seamlessly and transparently with its supply chain partners. The channel controller works with the network exposure function (NEF) and the network slice selection function (NSSF) to monitor and dynamically configure the network slicing resources allocated to the communication channel. The channel controller monitors the types of communication flowing in this communication channel and adapts the slicing resources allocated to the communication channel whereby to achieve the desired communication objectives while at the same time meeting those communication objectives efficiently. This is a solution that does not deploy a "one size fits all" communication channel or a statically configured communication channel for a given enterprise-to-partner path but rather dynamically manages the configuration as the application layer needs of the communication channel varies.

The channel controller scales network slicing resources up and down as needed by the current application layer communication types (e.g., what kind of communication is occurring) being sent in the communication channel. The channel controller, for example, can adapt the resources of each of the mobile broadband network slice, the machine-to-machine network slice, and/or the mission critical network slice that may be combined to form the communication channel. The channel controller sends commands to the NSSF to adapt the allocation of network slicing resources to the given communication channel. In an embodiment, the channel controller is embodied as a new network function in the core network. In another embodiment, the channel controller may be embodied in the NEF (e.g., as an extension of the conventional NEF functionality).

Turning now to FIG. 1, a system 100 is described. In an embodiment, the system 100 comprises a warehouse 102 or other distribution facility. The warehouse 102 comprises a first area 104 in which articles are stored. Each article may have a radio frequency identity (RFID) tag 106 affixed to the article or to a package that retains the article. While one RFID tag 106 is illustrated with in the first area 104, it is understood that RFID tags may be attached to a large number of different articles in the first area 104, for example hundreds of articles, thousands of articles, tens of thousands of articles, or hundreds of thousands of articles. The articles may be product items such as smart phones or other electronic items. The articles may be food product items. The articles may be beverage items. The articles may be clothing. The articles may be furniture. The articles may be tools. The articles may be construction supplies or materials. The articles may be other articles of inventory.

A first RFID reader 110 comprising an RFID tag reader 112 and a cellular radio transceiver 114 may be located in the warehouse 102. The first RFID reader 110 may be proximate to the first area 104 and may transmit an electromagnetic power signal to the RFID tags 106 affixed to articles in the first area 104. The RFID tags 106 affixed to articles in the first area 104 may harvest the power signal emitted by the first RFID reader 110 and provide information via a short-range radio signal back to the RFID tag reader 112. In an embodiment, the RFID tags 106 may communicate with the first RFID reader 110 via a cellular radio link. Providing a cellular radio link between the RFID tags 106 and the first RFID reader 110 may allow the first RFID reader 110 to read and to communicate with the RFID tags 106 at a greater distance, because the operator of the first RFID reader 110 may be authorized to transmit with higher radio power in a licensed cellular spectrum band than in the short-range radio frequency band. The RFID tag reader 112 may capture and store the information transmitted by the RFID tags affixed to articles in the first area 104. The cellular radio transceiver 114 establishes a first cellular radio link 116 with a cell site 120 and transmits the information about the RFID tags 106 affixed to the articles in the first area 104 via the first cellular radio link 116, via the cell site to a network 122 and via the network to an inventory control server application 126 executing on an enterprise server 124. The network 122 comprises one or more public networks, one or more private networks, or a combination thereof.

A second RFID reader 111 that is substantially similar to the first RFID reader 110 may be located in the warehouse 102 proximate to a second area 108 of the warehouse 102. The second RFID reader 112 may transmit an electromagnetic power signal in the second area 108, causing RFID tags in the second area 108 to harvest power and transmit their information via short-range radio signal back to the second RFID reader 111. In an embodiment, the RFID tags in the second area 108 may communicate with the second RFID reader 111 via a cellular radio link. Providing a cellular radio link between the RFID tags in the second area 108 and the second RFID reader 111 may allow the second RFID reader 111 to read and to communicate with the RFID tags in the second area 108 at a greater distance, because the operator of the second RFID reader 111 may be authorized to transmit with higher radio power in a licensed cellular spectrum band than in the short-range radio frequency band. The second RFID reader 111 may establish a second cellular radio link 118 with the cell site 120 and transmit the information collected from RFID tags in the second area 108 via the cell site 120, via the network 122, to the inventory control server application 126. In an embodiment, the warehouse 102 may comprise any number of different areas. In an embodiment, there may be any number of RFID readers disposed within the warehouse 102 to interact with RFID tags in the different areas within the warehouse 102. The cell site 120 is able to establish the cellular radio links 116, 118 according to one or more of a 5G, long-term evolution (LTE), code division multiple access (CDMA), or global system for mobile communication (GSM) telecommunication protocol. In a preferred embodiment, the cell site 120 is able to establish the cellular radio links 116, 118 according to a 5G telecommunication protocol or a 6G telecommunication protocol. In an embodiment, the RFID readers 110, 111 may establish a wireless communication link via a wireless access point that is not a cellular radio link but a different kind of radio link, and the wireless access point may communicatively couple the RFID readers 110, 111 to the network 122.

The inventory control sever application 126 may collect and analyze information collected by RFID readers 110, 111 stationed within the warehouse 102. The inventory control server application 126 may identify quantities of different articles stored in the warehouse 102 and the locations of the different articles, whereby to support picking articles by human workers or by robots for order and shipping fulfill-ment. The inventory control server application 126 may manage inventor of articles in the warehouse 102 by desig-nating a preferred order of picking articles for order and shipping fulfillment, for example to manage shelf-lives or perishable products. The inventory control server applica-tion 126 can issue commands to the RFID readers 110, 111 and/or to other electronic items within the warehouse 102, for example to one or more robots 115 disposed in the warehouse 102. The robots 115 may be communicatively linked to the network 122 by a cellular radio communication link or by a wireless communication link that is not a cellular radio link.

The robots 115 may be dispatched by the inventory control server application 126 to pick articles for order and shipping fulfillment. The robots 115 may be dispatched by the inventory control server application 126 to move a pallet of picked orders to a loading dock, to be loaded onto a truck for distribution to a retail location, such as a grocery store, a hardware store, or an electronics store. The robots 115 may be dispatched by the inventory control server application 126 to unload one or more pallets or boxes of articles being delivered to the warehouse 102, for example delivered by an original equipment manufacturer (OEM).

While the inventory management operations described schematically above are relatively simple, it will be appre-ciated that the actual details of inventory management and order fulfillment can be quite complicated. Additionally, the inventory management operations are likely all being con-ducted in a concurrent manner with different inventory management operations at different stages of completion at any given time. The inventory control server application 126 will coordinate and interleave these on-going different inventory management operations so as to avoid collision among robots 115 and to efficiently manage the articles in the warehouse 102. To support these complex inventory management operations, the network 122 desirably provides a communication channel that is fitted to the specific needs of the given inventory management environment and that is dynamically adaptable to changing needs of the inventory management environment.

In an embodiment, the robots 115 may comprise a RFID tag reader 112 and may provide a power signal to enable RFID tags 106 and/or RFID tags in the second area 108 to transmit their information to the robots 115 and/or to com-municate bidirectionally with the robots 115. In an embodi-ment, the robots 115 may communicate with the RFID tags 106 and/or RFID tags in the second area 108 using short-range radio signals. In another embodiment, the robots 115 may communicate with the RFID tags 106 and/or RFID tags in the second area 108 using cellular radio links, which mall allow the robots 115 to communicate with the RFID tags 106 and/or RFID tags in the second area 108 at a greater distance.

Figure 2:
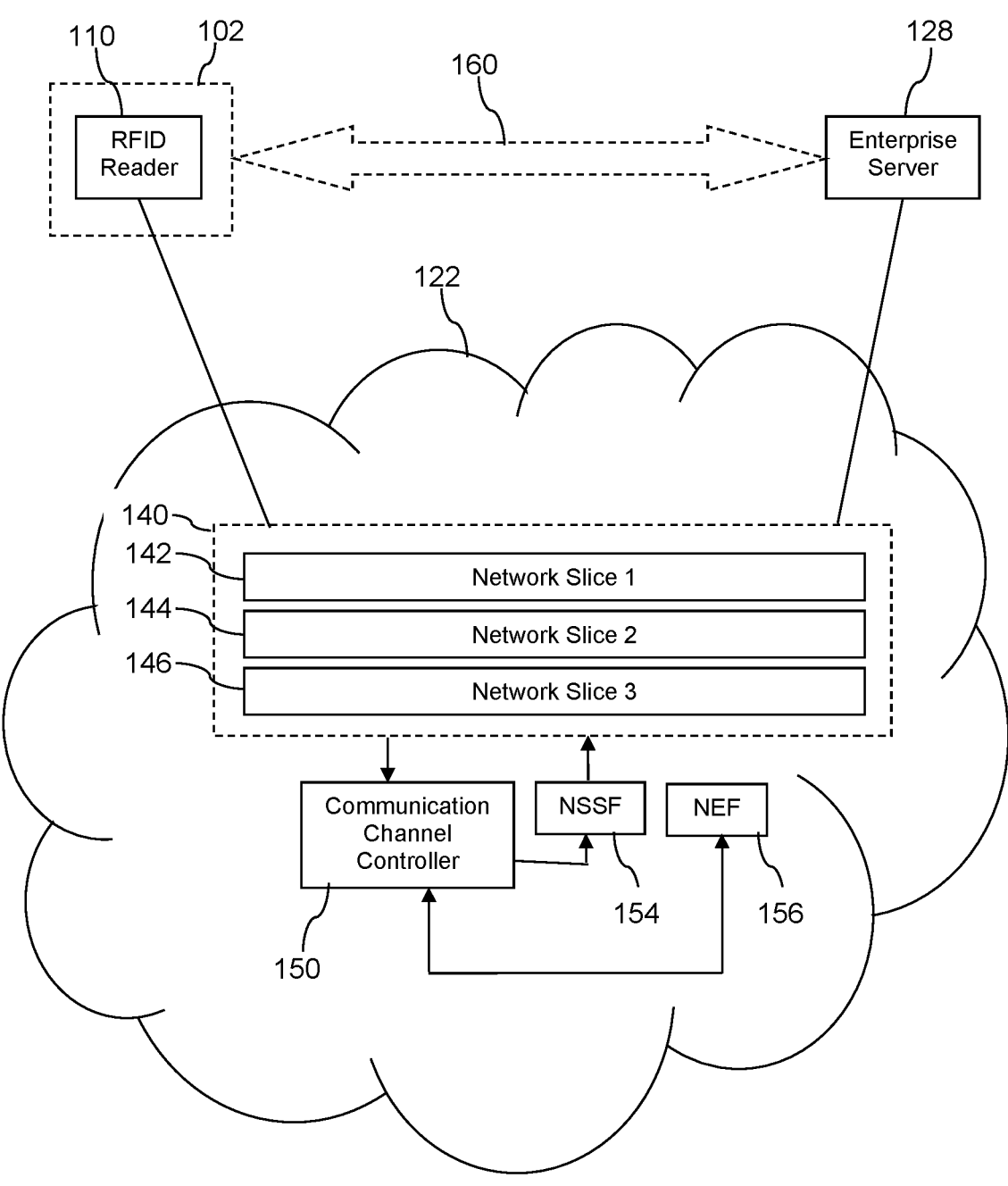
FIG. 2 is a block diagram of a communication channel according to an embodiment of the disclosure.

Turning now to FIG. 2, a communication channel 140 is described. In an embodiment, the communication channel 140 may be provided as a communication service to a subscriber of a wireless communication service provider. The wireless communication service provider may provide different communication channels 140 for different subscrib-ers. For example, a first enterprise subscriber may have a first communication service provided to it by the wireless communication service provider and a second enterprise subscriber may have a second communication service pro-vided to it by the same wireless communication service provider. It is understood that the wireless communication service provider may provide any number of separate com-munication channels 140 to different subscribers. Addition-ally, a single subscriber may subscribe for two or more concurrent communication channels 140, for example dis-posed between different communication end points.

The communication channel 140 may be provided as a combination of a first network slice 142, a second network slice 144, and a third network slice 146. The first network slice 142 may be a mobile broadband network slice. The second network slice 144 may be a machine-to-machine network slice. The third network slice 146 may be a mission critical network slice. At different times, the communication channel 140 may be provided by only a single one of the slices 142, 144, 146; by two of the slices 142, 144, 146; or by all three of the slices 142, 144, 146.

In an embodiment, a communication channel controller 150 executes in the network 122 and adapts the communi-cation channel 140 over time to satisfy the immediate communication needs of a communication service 160 pro-vided to communicatively link the enterprise server 128 to the RFID readers 110, 111 and robots 115. The communi-cation channel 150 monitors communication traffic between the enterprise server 128 and the warehouse 102 (e.g., the RFID readers 110, 111 and robots 115). Monitoring the communication traffic comprises counting and determining a traffic load in each of the slices 142, 144, 146. In an embodiment, the monitoring further comprises determining an application layer type of the messages of the communi-cation traffic. For example, determining if a message com-prises an inventory information content or an inventory command. An inventory command may command the RFID reader 110, 111 to take an action or may command one of the robots 115 to take an action.

The communication channel controller 150 interacts with a network exposure function (NEF) 156 and a network slice selection function (NSSF) to manage and configure the communication channel 140. In an embodiment, the communication channel controller 150 may be incorporated or embedded in the NEF 156. In another embodiment, the communication channel controller 150 is a separate application that executes on a computer system in the network 122. In an embodiment, the communication channel controller 150 may be implemented as a virtual network function and may be executed on one or more computer systems in the network 122 and/or in a cloud computing environment. Because the communication channel controller 150 interacts closely with the NSSF 154, in a preferred embodiment, the communication channel controller 150 is deployed within the equipment and systems of the wireless communication service provider, which may be considered to be a part of the network 122.

Turning now to FIG. 3, a method 200 is described. In an embodiment, the method 200 is a method of providing a communication service in a telecommunication network to a plurality of radio frequency identity (RFID) tag readers located in a warehouse and an enterprise inventory control system located remotely from the warehouse. At block 202, the method 200 comprises allocating network slice resources of the telecommunication network for a plurality of RFID tag readers by a controller by sending a first message to a network slice selection function (NSSF) in the telecommunication network, wherein the allocated network slice resources includes a combination of mobile broadband network slice resources, machine-to-machine network slice resources, and mission critical network slice resources and wherein the controller is an application that executes on a computer system in the telecommunication network. In an embodiment, the controller is integrated into a network exposure function (NEF) of the telecommunication network. In an embodiment, the controller is deployed as a virtual network function (VNF) within the telecommunication network.

At block 204, the method 200 comprises providing a communication channel between the RFID tag readers and an enterprise inventory control system via the allocated network slice resources, wherein the RFID tag readers are linked to the communication channel by a cellular radio link or by a different wireless communication link. In an embodiment, the cellular radio link is a 5G cellular radio link. In an embodiment, the cellular radio link is a 6G cellular radio link. In an embodiment, the cellular radio link is a long-term evolution (LTE) cellular radio link. At block 206, the method 200 comprises monitoring messages in the allocated network slice resources by the controller. In an embodiment, monitoring messages in the allocated network slice resource comprises counting and determining a traffic load in each of the mobile broadband network slice resources, the machine-to-machine network slice resources, and the mission critical network slice resources.

At block 208, the method 200 comprises analyzing the messages by the controller. In an embodiment, analyzing messages by the controller comprises determining an application layer type of the messages. At block 210, the method 200 comprises determining by the controller a network slice resource need of the communication channel that differs from a current allocation of network slice resources based on the analyzing. At block 212, the method 200 comprises adapting the communication channel by the controller by sending messages to the NSSF to allocate different network slice resources associated with the communication channel.

It is understood that the communication channel can also be provided between one or more robots located at the warehouse and the enterprise inventory control system.

Figure 4:
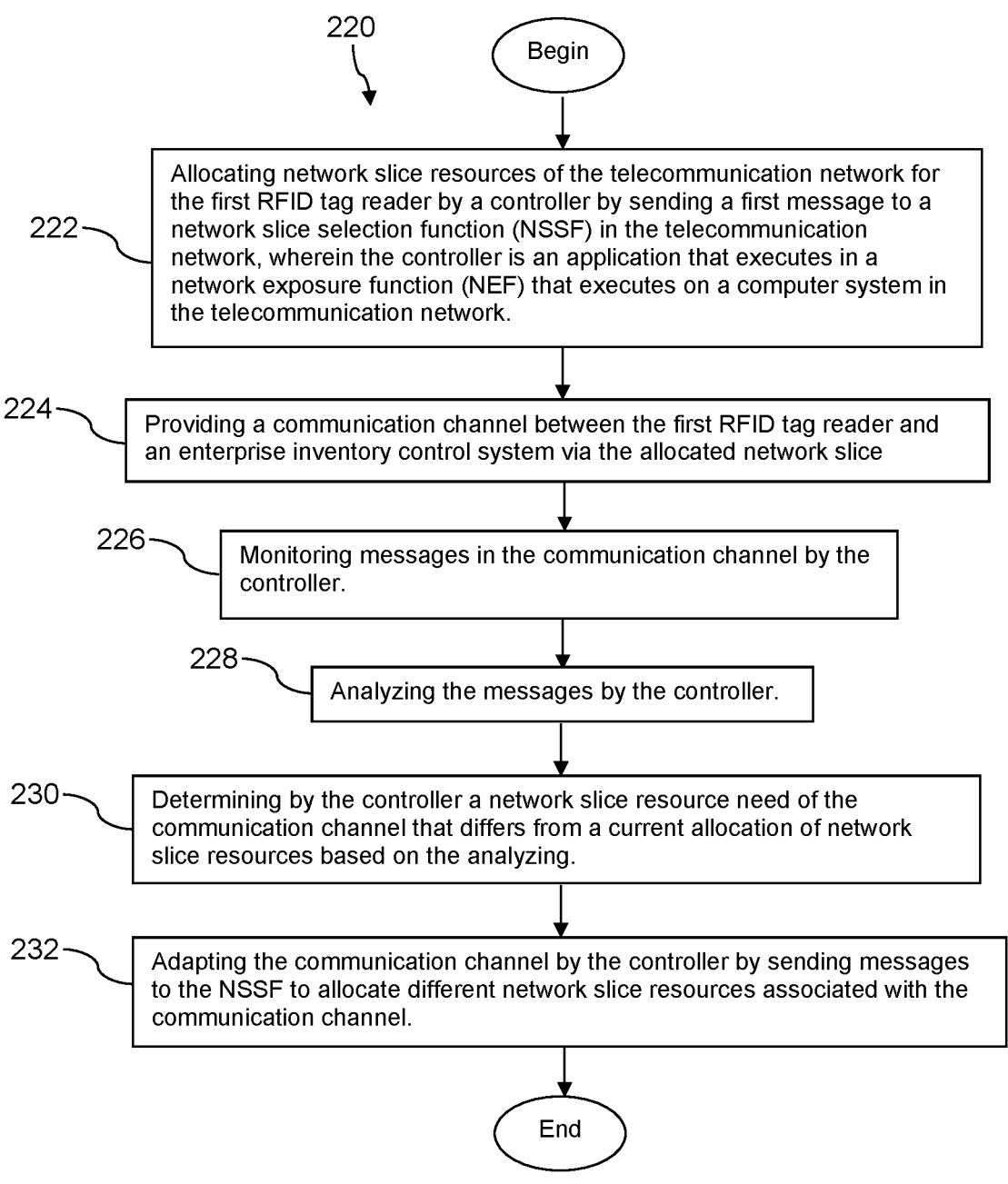
FIG. 4 is a flow chart of another method according to an embodiment of the disclosure.

Turning now to FIG. 4, a method 220 is described. In an embodiment, the method 220 is a method of method of providing a communication service in a telecommunication network to a first radio frequency identity (RFID) tag reader. In an embodiment, the telecommunication network is a 5G communication network or a 6G communication network. In an embodiment, the communication service provides communication via the communication channel to a plurality of RFID tag readers and the first RFID tag reader is one of the plurality of RFID tag readers. In an embodiment, the plurality of RFID tag readers are located within a warehouse. In an embodiment, the communication service provides communication via the communication channel to a plurality of robots located within the warehouse. At block 222, the method 220 comprises allocating network slice resources of the telecommunication network for the first RFID tag reader by a controller by sending a first message to a network slice selection function (NSSF) in the telecommunication network, wherein the controller is an application that executes in a network exposure function (NEF) that executes on a computer system in the telecommunication network.

At block 224, the method 220 comprises providing a communication channel between the first RFID tag reader and an enterprise inventory control system via the allocated network slice resources. At block 226, the method 220 comprises monitoring messages in the communication channel by the controller. In an embodiment, at least some of the messages in the communication channel comprise commands issued by the enterprise inventory control system to the robots. In an embodiment, at least some of the messages in the communication channel comprise information about a position of one of the plurality of robots within the warehouse.

At block 228, the method 220 comprises analyzing the messages by the controller. At block 230, the method 220 comprises determining by the controller a network slice resource need of the communication channel that differs from a current allocation of network slice resources based on the analyzing. At block 232, the method 220 comprises adapting the communication channel by the controller by sending messages to the NSSF to allocate different network slice resources associated with the communication channel.

Turning now to FIG. 5, a method 240 is described. In an embodiment, the method 240 is a method of providing a communication service in a telecommunication network to a radio frequency identity (RFID) tag reader. At block 242, the method 240 comprises allocating network slice resources of the telecommunication network for the RFID tag reader by a controller by sending a first message to a network slice selection function (NSSF) in the telecommunication network, wherein the controller is an application that executes on a computer system in the telecommunication network.

At block 244, the method 240 comprises providing a communication channel between the RFID tag reader and an enterprise inventory control system via the allocated network slice resources. In an embodiment, the communication channel is linked to the RFID tag reader via a cellular radio link. At block 246, the method 240 comprises monitoring messages in the communication channel by the controller. In an embodiment, monitoring messages in the communication channel by the controller comprises counting and determining a traffic load in communication channel. At block 248, the method 240 comprises analyzing the messages by the controller. In an embodiment, analyzing the messages by the controller comprises determining an application layer type of the messages.

At block 250, the method 240 comprises determining by the controller a network slice resource need of the communication channel that differs from a current allocation of network slice resources based on the analyzing. At block 252, the method 240 comprises adapting the communication channel by the controller by sending messages to the NSSF to allocate different network slice resources associated with the communication channel.

In an embodiment, some of the messages sent to the NSSF command the NSSF to allocate increased network slice resources to the communication channel. In an embodiment, some of the message sent to the NSSF command the NSSF to allocate decreased network slice resources to the communication channel.

Figure 6A:
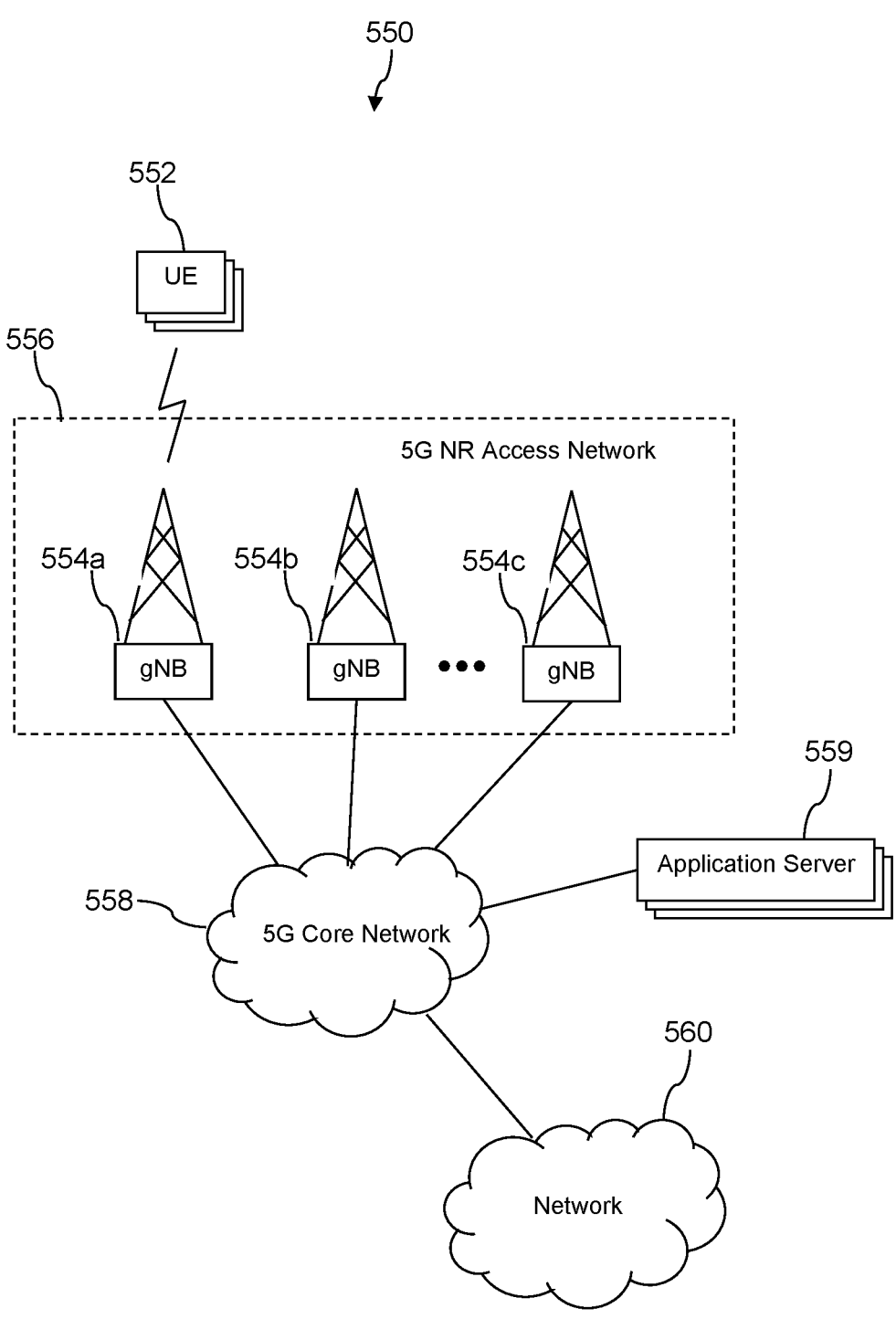
FIG. 6A and FIG. 6B are block diagrams of a communication system according to an embodiment of the disclosure.

Turning now to FIG. 6A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/ or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
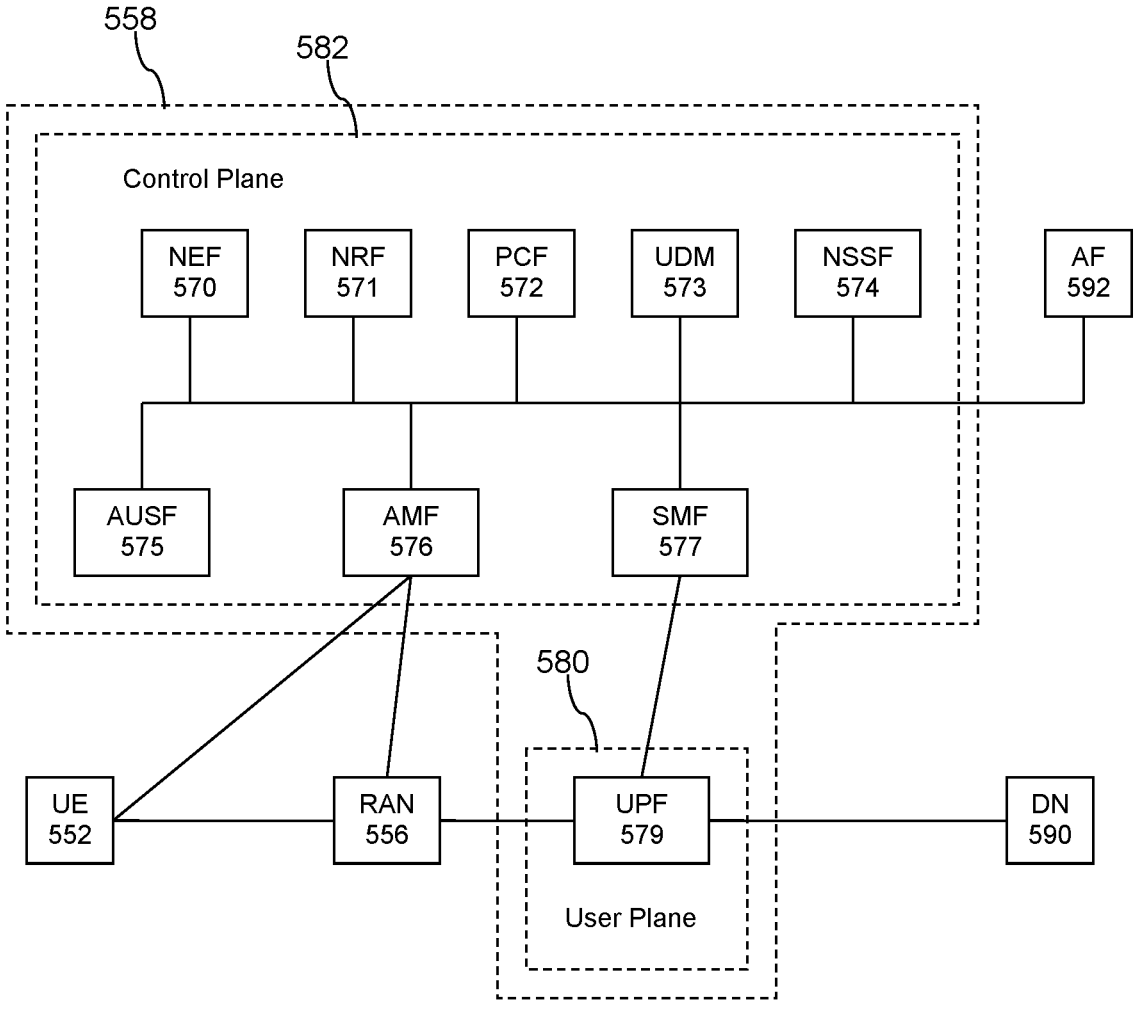

Turning now to FIG. 6B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
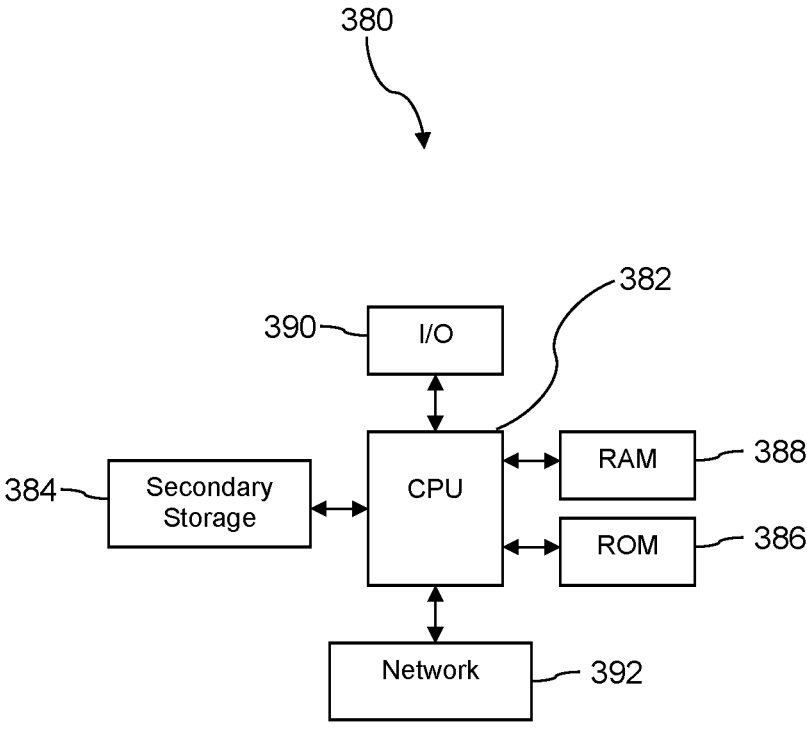
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a communication service in a telecommunication network to a plurality of radio frequency identity (RFID) tag readers located in a warehouse and an enterprise inventory control system located remotely from the warehouse, comprising:

allocating network slice resources of the telecommunication network for a plurality of RFID tag readers by a controller by sending a first message to a network slice selection function (NSSF) in the telecommunication network, wherein the allocated network slice resources includes a combination of mobile broadband network slice resources, machine-to-machine network slice resources, and mission critical network slice resources and wherein the controller is an application that executes on a computer system in the telecommunication network;

providing a communication channel between the RFID tag readers and an enterprise inventory control system via the allocated network slice resources, wherein the RFID tag readers are linked to the communication channel by a cellular radio link;

monitoring messages in the allocated network slice resources by the controller;

analyzing the messages by the controller;

determining by the controller a network slice resource need of the communication channel that differs from a current allocation of network slice resources based on the analyzing; and adapting the communication channel by the controller by sending messages to the NSSF to allocate different network slice resources associated with the communication channel.

2. The method of claim 1, wherein the cellular radio link is a 5G cellular radio link.

3. The method of claim 1, wherein the cellular radio link is a 6G cellular radio link.

4. The method of claim 1, wherein monitoring messages in the allocated network slice resource comprises counting and determining a traffic load in each of the mobile broadband network slice resources, the machine-to-machine network slice resources, and the mission critical network slice resources.

5. The method of claim 1, wherein analyzing the messages by the controller comprises determining an application layer type of the messages.

6. The method of claim 1, wherein the controller is integrated into a network exposure function (NEF) of the telecommunication network.

7. The method of claim 1, wherein the controller is deployed as a virtual network function (VNF) within the telecommunication network.

8. A method of providing a communication service in a telecommunication network to a first radio frequency identity (RFID) tag reader, comprising:

allocating network slice resources of the telecommunication network for the first RFID tag reader by a controller by sending a first message to a network slice selection function (NSSF) in the telecommunication network, wherein the controller is an application that executes in a network exposure function (NEF) that executes on a computer system in the telecommunication network;

providing a communication channel between the first RFID tag reader and an enterprise inventory control system via the allocated network slice resources;

monitoring messages in the communication channel by the controller;

analyzing the messages by the controller;

determining by the controller a network slice resource need of the communication channel that differs from a current allocation of network slice resources based on the analyzing; and adapting the communication channel by the controller by sending messages to the NSSF to allocate different network slice resources associated with the communication channel.

9. The method of claim 8, wherein the communication service provides communication via the communication channel to a plurality of RFID tag readers and the first RFID tag reader is one of the plurality of RFID tag readers.

10. The method of claim 9, wherein the plurality of RFID tag readers are located within a warehouse.

11. The method of claim 10, wherein the communication service provides communication via the communication channel to a plurality of robots located within the warehouse.

12. The method of claim 11, wherein at least some of the messages in the communication channel comprise commands issued by the enterprise inventory control system to the robots.

13. The method of claim 11, wherein at least some of the messages in the communication channel comprise information about a position of one of the plurality of robots within the warehouse.

14. The method of claim 8, wherein the telecommunication network is a 5G communication network or a 6G communication network.

15. A method of providing a communication service in a telecommunication network to a radio frequency identity (RFID) tag reader, comprising:

allocating network slice resources of the telecommunication network for the RFID tag reader by a controller by sending a first message to a network slice selection function (NSSF) in the telecommunication network, wherein the controller is an application that executes on a computer system in the telecommunication network;

providing a communication channel between the RFID tag reader and an enterprise inventory control system via the allocated network slice resources;

monitoring messages in the communication channel by the controller;

analyzing the messages by the controller;

determining by the controller a network slice resource need of the communication channel that differs from a current allocation of network slice resources based on the analyzing; and adapting the communication channel by the controller by sending messages to the NSSF to allocate different network slice resources associated with the communication channel.

16. The method of claim 15, wherein some of the messages sent to the NSSF command the NSSF to allocate increased network slice resources to the communication channel.

17. The method of claim 15, wherein some of the messages sent to the NSSF command the NSSF to allocate decreased network slice resources to the communication channel.

18. The method of claim 15, wherein monitoring messages in the communication channel by the controller comprises counting and determining a traffic load in communication channel.

19. The method of claim 15, wherein analyzing the messages by the controller comprises determining an application layer type of the messages.

20. The method of claim 15, wherein the communication channel is linked to the RFID tag reader via a cellular radio link.

* * * * *